(12) United States Patent
Kim et al.

(10) Patent No.: US 7,991,518 B2
(45) Date of Patent: Aug. 2, 2011

(54) SYSTEM AND METHOD FOR CONTROLLING SATELLITE BASED ON INTEGRATED SATELLITE OPERATION DATA

(75) Inventors: In-Jun Kim, Daejon (KR); Won-Chan Jung, Daejon (KR); Jae-Hoon Kim, Daejon (KR)

(73) Assignee: Electronics and Telecommunications Research Institute (KR)

( * ) Notice: Subject to any disclaimer, the term of this patent is extended or adjusted under 35 U.S.C. 154(b) by 1007 days.

(21) Appl. No.: 11/897,492

(22) Filed: Aug. 29, 2007

(65) Prior Publication Data

US 2008/0249673 A1    Oct. 9, 2008

(30) Foreign Application Priority Data

Sep. 28, 2006 (KR) .................. 10-2006-0094981

(51) Int. Cl.
*B64G 1/36* (2006.01)
*G06F 7/70* (2006.01)
*G01C 21/00* (2006.01)

(52) U.S. Cl. ............................ 701/13; 701/14; 701/226

(58) Field of Classification Search ................ None
See application file for complete search history.

(56) References Cited

U.S. PATENT DOCUMENTS

| | | | | |
|---|---|---|---|---|
| 5,721,810 A * | 2/1998 | Hahn et al. | ........................ | 706/47 |
| 5,951,609 A * | 9/1999 | Hanson et al. | ................... | 701/13 |
| 5,966,640 A * | 10/1999 | Leath et al. | .................. | 455/12.1 |
| 6,052,588 A * | 4/2000 | Mo et al. | ......................... | 455/430 |
| 6,484,028 B2 * | 11/2002 | Okada et al. | ................... | 455/428 |
| 6,597,892 B1 * | 7/2003 | Caldwell et al. | ............. | 455/12.1 |
| 7,428,405 B2 * | 9/2008 | Kim et al. | ..................... | 455/12.1 |
| 7,756,517 B2 * | 7/2010 | Kim et al. | ..................... | 455/427 |
| 2003/0105989 A1 * | 6/2003 | Saunders | ......................... | 714/25 |
| 2006/0100752 A1 * | 5/2006 | Kim et al. | ........................ | 701/13 |
| 2006/0136103 A1 * | 6/2006 | Lee et al. | ......................... | 701/13 |
| 2007/0111724 A1 * | 5/2007 | Kim et al. | ..................... | 455/427 |
| 2007/0129922 A1 * | 6/2007 | Lee et al. | ......................... | 703/13 |
| 2008/0126765 A1 * | 5/2008 | Moser et al. | ................... | 712/226 |
| 2008/0134204 A1 * | 6/2008 | Cho et al. | ....................... | 719/314 |

FOREIGN PATENT DOCUMENTS

| | | |
|---|---|---|
| KR | 1996-0036378 | 10/1996 |
| KR | 10-0204051 B1 | 3/1999 |
| KR | 19980038854 A | 8/1999 |
| KR | 1020040046686 A | 6/2004 |
| KR | 1020060063622 A | 6/2006 |

* cited by examiner

*Primary Examiner* — Khoi Tran
*Assistant Examiner* — Ian Jen
(74) *Attorney, Agent, or Firm* — Blakely, Sokoloff, Taylor & Zafman

(57) ABSTRACT

Provided is a satellite control system based on integrated satellite operation data and a method thereof. The satellite control system includes: a satellite operation data schema editing means for creating a document type definition file and defining a schema; a mission planning means for creating a mission timeline and recording the mission timeline; a command planning means for converting a task into telecommands and recording the telecommand; a command preparing means for creating a telecommand procedure and recording the telecommand procedure; a command transmitting means for creating a telecommand code, transmitting the telecommand code to a satellite and recording the telecommand code; a command verifying means for receiving telemetry data and recording a telecommand verification result; and a performance result reporting means for creating a mission performance result and recording the mission performance result.

6 Claims, 6 Drawing Sheets

FIG. 5

SYSTEM AND METHOD FOR CONTROLLING SATELLITE BASED ON INTEGRATED SATELLITE OPERATION DATA

CROSS-REFERENCE(S) TO RELATED APPLICATIONS

The present invention claims priority of Korean Patent Application No. 10-2006-0094981, filed on Sep. 28, 2006, which is incorporated herein by reference.

BACKGROUND OF THE INVENTION

1. Field of the Invention

The present invention relates to a satellite control system based on integrated satellite operation data and a method thereof; and, more particularly, to a satellite control system based on integrated satellite operation data which can easily grasp relationship among satellite operating functions and easily perform a history management process of operation information by managing operation data that are generated while a satellite operates under the control of a satellite control system, in a format of integrated satellite operation document, and a method thereof.

2. Description of Related Art

A conventional satellite control system stores and manages satellite operation data generated from functional operation, individually. That is, the satellite operation data are independently stored without regard to output data of other functional operations. The satellite operation data are used only as input information of other functional operations. Therefore, the conventional satellite control system should compare the data with each other or determine the relationship between data based on time tag information or notation recorded in an output file.

Also, the satellite operation data may have different formats according to each functional operation. For example, diverse file formats such as .osl format as an output file of mission planning, .xml format as an output file of command planning, .dat format as an output file of command preparation, .bin format as an output file of command transmission, .log format as an output file of command verification result, and .html format as an output file of mission result report function are used according to each functional operation.

As described above, in the conventional technology, data created in each function for satellite operation exist as an independent file and there are many cases that the formats are different from each other. Accordingly, a large quantity of data should be respectively managed according to each function and it is difficult for user to compare data with other data or examine the data.

SUMMARY OF THE INVENTION

An embodiment of the present invention is directed to providing a satellite control system based on integrated satellite operation data which can easily grasp relationship in a satellite functional operation and easily perform a history managing process on operation information by managing operation data, which are generated while a satellite is operated in a satellite control system, as an integrated satellite operation document, and a method thereof.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an aspect of the present invention, there is provided a satellite control system based on integrated satellite operation data, including: a satellite operation data schema editing means for creating a document type definition file and defining a schema of an integrated satellite operation document; a mission planning means for creating a mission timeline upon mission request from a user and recording the mission timeline in the integrated satellite operation document; a command planning means for converting a task for performing a mission into telecommands based on the created mission timeline and recording the telecommand in the integrated satellite operation document; a command preparing means for creating a telecommand procedure on the converted command plan and recording the telecommand procedure in the integrated satellite operation document; a command transmitting means for creating a telecommand code on the created telecommand procedure, transmitting the telecommand code to a satellite, and recording the telecommand code in the integrated satellite operation document; a command verifying means for receiving telemetry data corresponding to the transmitted telecommand code from the satellite and recording a telecommand verification result on the received telemetry data in the integrated satellite operation document; and a performance result reporting means for creating a mission performance result on the telecommand and recording the mission performance result in the integrated satellite operation document.

In accordance with another aspect of the present invention, there is provided a satellite control method based on integrated satellite operation data, including the steps of: a) defining a schema of an integrated satellite operation document; b) creating a mission timeline upon mission request from a user, and recording the mission timeline in the integrated satellite operation document; c) converting a task for performing a mission into telecommands based on the created mission timeline and recording the mission timeline in the integrated satellite operation document; d) creating and recording a telecommand procedure on the converted telecommand in the integrated satellite operation document; e) creating a telecommand code on the created telecommand procedure to a satellite, and transmitting the telecommand code in the integrated satellite operation document; f) receiving telemetry data corresponding to the telecommand code transmitted from the satellite and recording the telecommand verification result on the received telemetry data in the integrated satellite operation document; and g) creating a mission performance result on the telecommand and recording the mission performance result in the integrated satellite operation document.

BRIEF DESCRIPTION OF THE DRAWINGS

FIG. 5 shows a satellite operation data schema editor of FIG. 1.

DESCRIPTION OF SPECIFIC EMBODIMENTS

Other objects and advantages of the present invention will become apparent from the following description of the embodiments with reference to the accompanying drawings. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Figure 1:
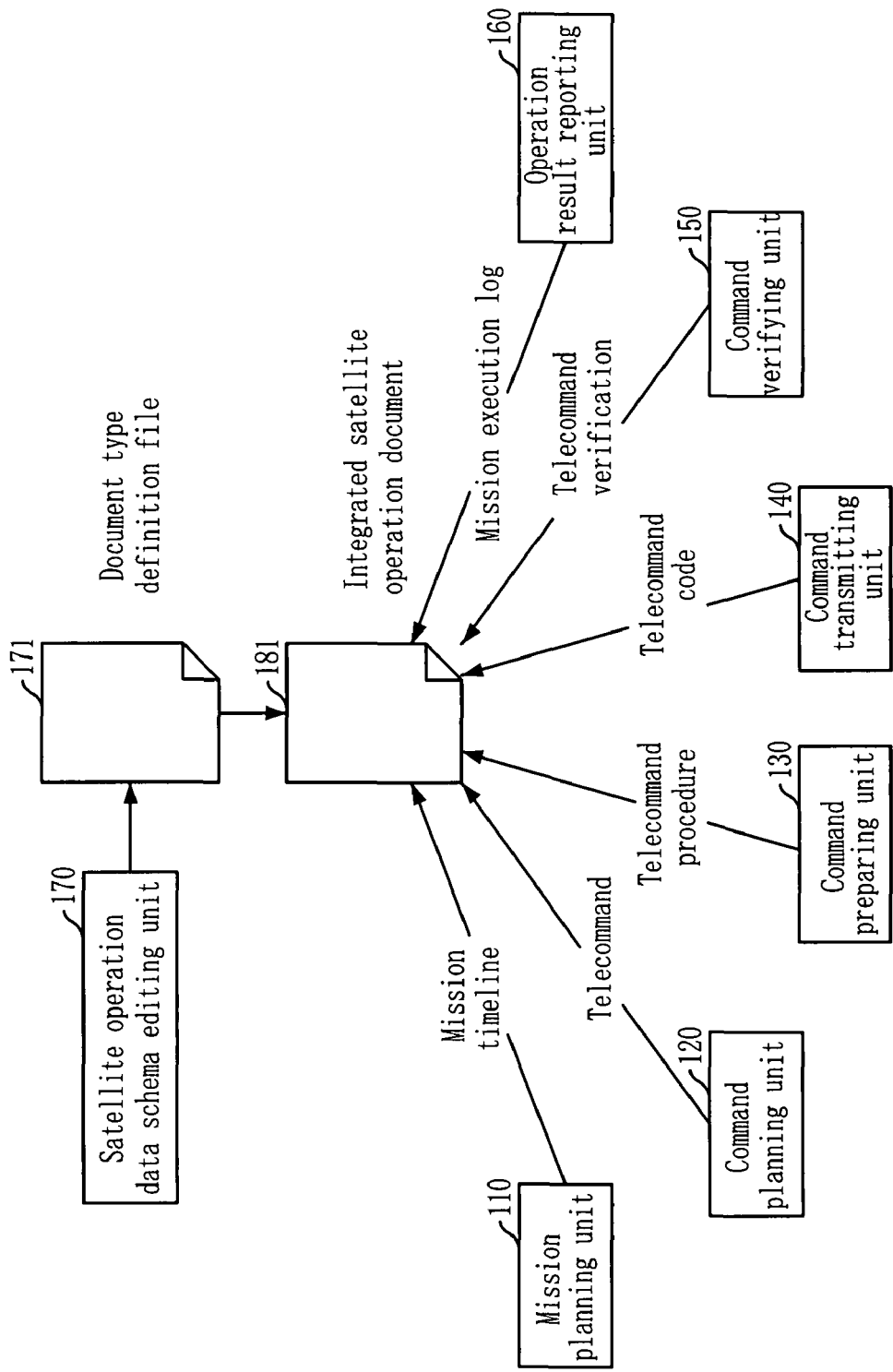
FIG. 1 shows relationship between integrated satellite operation data and a satellite control system in accordance with an embodiment of the present invention.

FIG. 1 shows relationship between integrated satellite operation data and a satellite control system in accordance with an embodiment of the present invention.

The satellite control system according to the present invention includes a mission planning unit 110, a command planning unit 120, a command preparing unit 130, a command transmitting unit 140, a command verifying unit 150, an operation result reporting unit 160, and a satellite operation data schema editing unit 170.

Each constituent element of the satellite control system will be described hereinafter. The satellite operation data schema editing unit 170 defines a schema of an integrated satellite operation document 181. Also, the satellite operation data schema editing unit 170 creates a document type definition file 171. The schema for the integrated satellite operation document 181 is defined in the document type definition file 171. The integrated satellite operation document 181 is formed with reference to the contents of the document type definition file 171.

The mission planning unit 110 forms a mission schedule in consideration of a satellite and resources upon mission request from a user. Subsequently, the mission planning unit 110 creates a mission timeline finally defining a performance time, a mission, and a task for performing the mission. Also, the mission planning unit 110 records the mission timeline in mission and task items of the integrated satellite operation document 181.

The command planning unit 120 converts the task for performing the mission by mapping the task to a command plan. The mapping process is performed based on the contents of the mission timeline created in the mission planning unit 110. Also, the command planning unit 120 records the telecommand in a telecommand item of the integrated satellite operation document 181.

The command preparing unit 130 concretizes the telecommand created in the command planning unit 120. The command preparing unit 130 controls setup of an argument value of the telecommand and setup of a command transmission mode in detail. Also, the command preparing unit 130 confirms a telecommand procedure to be finally transmitted to the satellite. Also, the command preparing unit 130 records the telecommand procedure in the telecommand item of the integrated satellite operation document 181.

The command transmitting unit 140 transmits the telecommand of the telecommand procedure confirmed in the command preparing unit 130 to the satellite. The command transmitting unit 140 creates a telecommand binary code related to the telecommand to transmit the telecommand. Also, the command transmitting unit 140 records the telecommand binary code in the telecommand code item of the integrated satellite operation document 181.

The command verifying unit 150 checks whether the telecommand transmitted to the satellite is normally executed in the satellite. To perform the checking process, the command verifying unit 150 receives telemetry data from the satellite and determines whether the telemetry data are normal. Also, the command verifying unit 150 records the determination result of the telemetry data in a telecommand verification result item.

When the telecommand transmitted to the satellite is completely performed and the command verifying unit 150 finishes verifying the command execution, the operation result reporting unit 160 reports to the user whether the mission request is completely transmitted to the satellite and the mission is performed. The operation result reporting unit 160 creates a mission execution log for the above process. Also, the operation result reporting unit 160 records the mission execution log in a mission execution log item.

Figure 2:
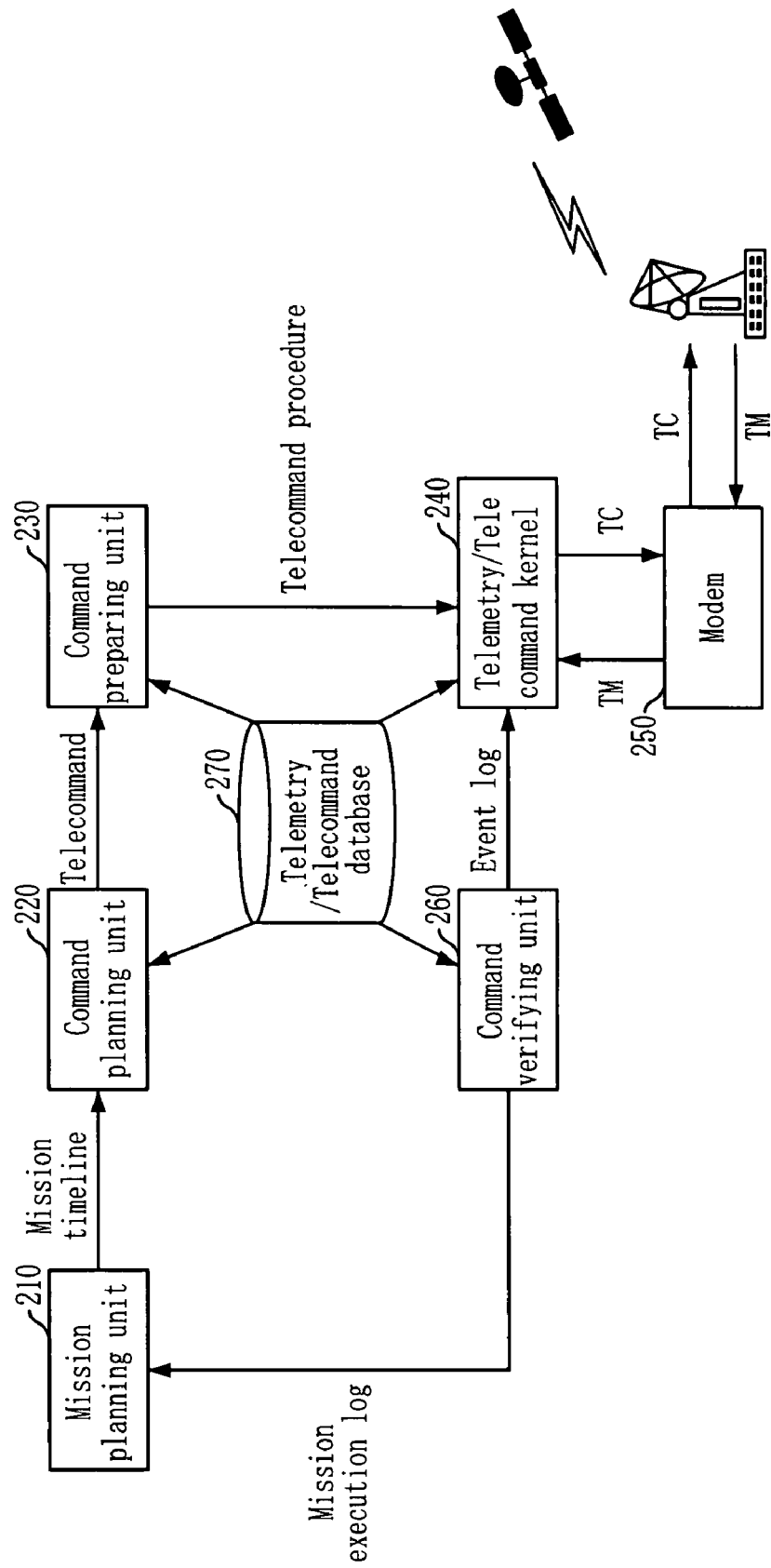
FIG. 2 is a block diagram showing the satellite control system based on the integrated satellite operation data in accordance with an embodiment of the present invention.

FIG. 2 is a block diagram showing the satellite control system based on integrated satellite operation data in accordance with an embodiment of the present invention.

As shown in FIG. 2, the satellite control system according to the present invention includes a mission planning unit 210, a command planning unit 220, a command preparing unit 230, a telemetry/telecommand kernel 240 for performing telemetry/telecommand, a modem 250 for processing and modulating/demodulating a transmission frame, and a command verifying unit 260 based on the telemetry data.

Each constituent element of the satellite control system according to the present invention will be described hereinafter.

The mission planning unit 210 creates a mission timeline upon request for mission performance from the user and records the mission timeline in an integrated satellite operation document.

The command planning unit 220 converts a task for performing a mission into a telecommand based on the mission timeline created in the mission planning unit 210 and records the telecommand in the integrated satellite operation document. The command preparing unit 230 further concretizes the telecommand created in the command planning unit 220. That is, the command preparing unit 230 can perform detailed control such as setup of an argument value for the telecommand and setup of the command transmission mode. Also, the command preparing unit 230 confirms a telecommand procedure to be finally transmitted to the satellite.

The telemetry/telecommand kernel 240 transmits the telecommand in the telecommand procedure confirmed in the command preparing unit 230 to the satellite through the modem 250. The telemetry/telecommand kernel 240 creates a telecommand binary code related to telecommand to transmit the telecommand and transmits the telecommand binary code to the satellite.

The modem 250 processes or modulates/demodulates a transmission frame to be transmitted to the satellite. Also, the modem 250 receives telemetry data from the satellite.

The command verifying unit 260 checks whether the telecommand transmitted to the satellite is normally processed in the satellite. To perform the above checking process, the command verifying unit 260 receives telemetry data from the modem 250 and determines whether the telemetry data are normal. Also, when the telecommand transmitted to the satellite is completely performed and verifying the command execution is finished, the command verifying unit 260 reports to the user whether the mission request is completely transmitted to the satellite and the mission is performed. The command verifying unit 260 creates a mission execution log for the above process.

Figure 3:
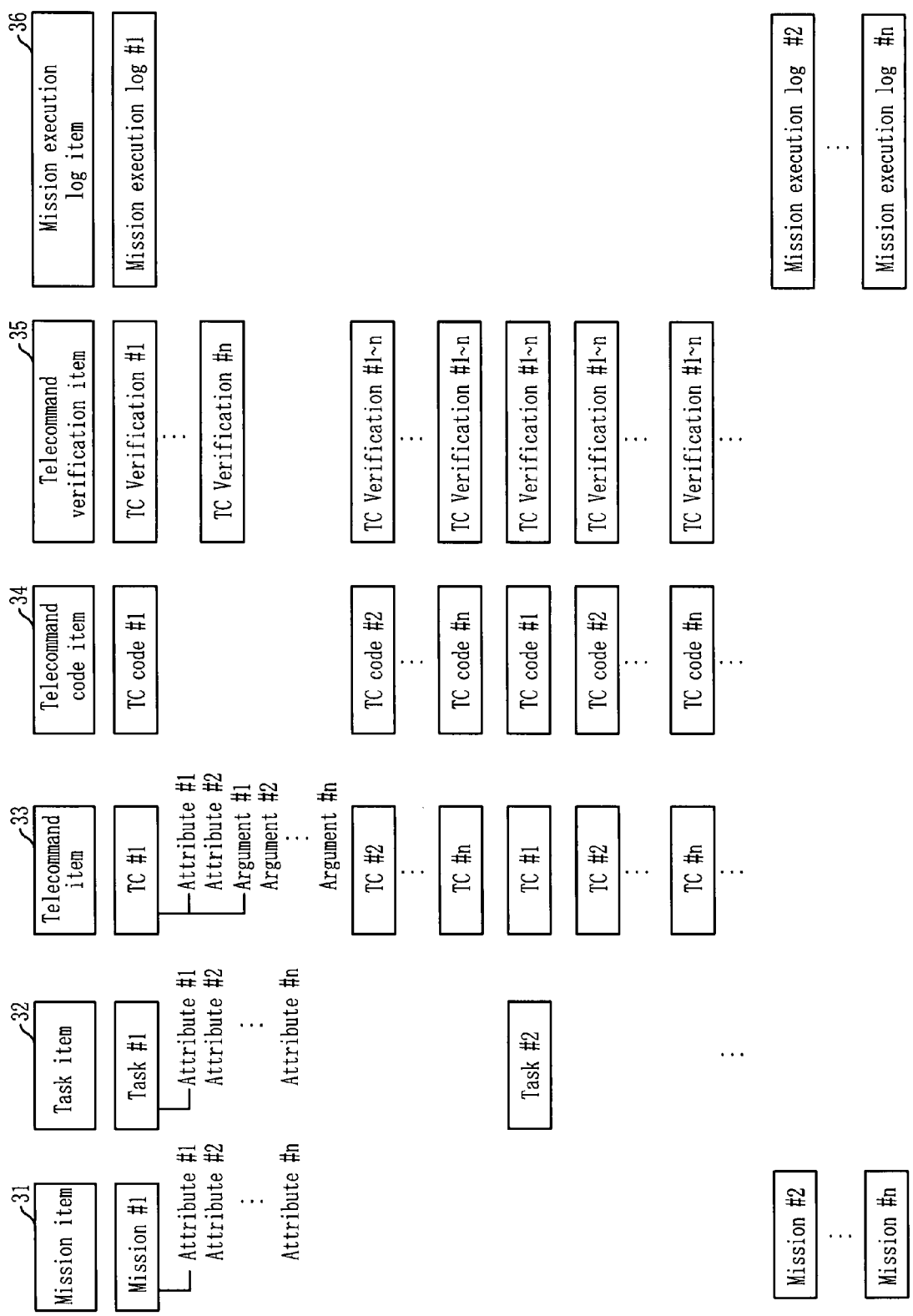
FIG. 3 shows an integrated satellite operation document in accordance with the embodiment of the present invention.

FIG. 3 shows an integrated satellite operation document in accordance with the embodiment of the present invention.

As shown in FIG. 3, the integrated satellite operation document includes a mission item 31, a task item 32, a telecommand item 33, a telecommand code item 34, a telecommand verification item 35, and a mission execution log item 36. Each item will be described in detail with reference to functional operations.

The mission planning unit 110 records contents of the mission timeline in the mission item 31 and the task item 32 of the integrated satellite operation document. The mission item 31 defines a mission that the satellite should perform and includes an attribute of each mission.

The task item 32 defines a task, which is a work unit for concretizing the mission, and may include an attribute of the task.

The command planning, unit 120 records the telecommand in the telecommand item 33 of the integrated satellite operation document. Also, the command preparing unit 130 records contents, which are confirmed in a telecommand procedure, in the telecommand item 33 of the integrated satellite operation data. The telecommand item 33 includes a telecommand list for operating each task. The telecommand item 33 can designate a parameter value such as an attribute and an argument of the telecommand.

The command transmitting unit 140 transmits the command and records a telecommand code in the telecommand code item 34 created with reference to a telemetry/telecommand database 270.

When the telecommand code is transmitted to the satellite, the command verifying unit 150 checks the telemetry data, which are the performance result of the satellite, and records the telemetry data in the telecommand verification item 35.

When it is determined that all telecommand verification items 35 are successful, the operation result reporting unit 160 marks in the mission performance log item 36 whether the mission performance is successful.

A configuration of the integrated satellite operation document can be corrected in conformity to an operation system based on the satellite operation data schema editing unit 170 described in FIG. 1 and can be defined as the integrated satellite operation document of diverse formats.

Figure 4:
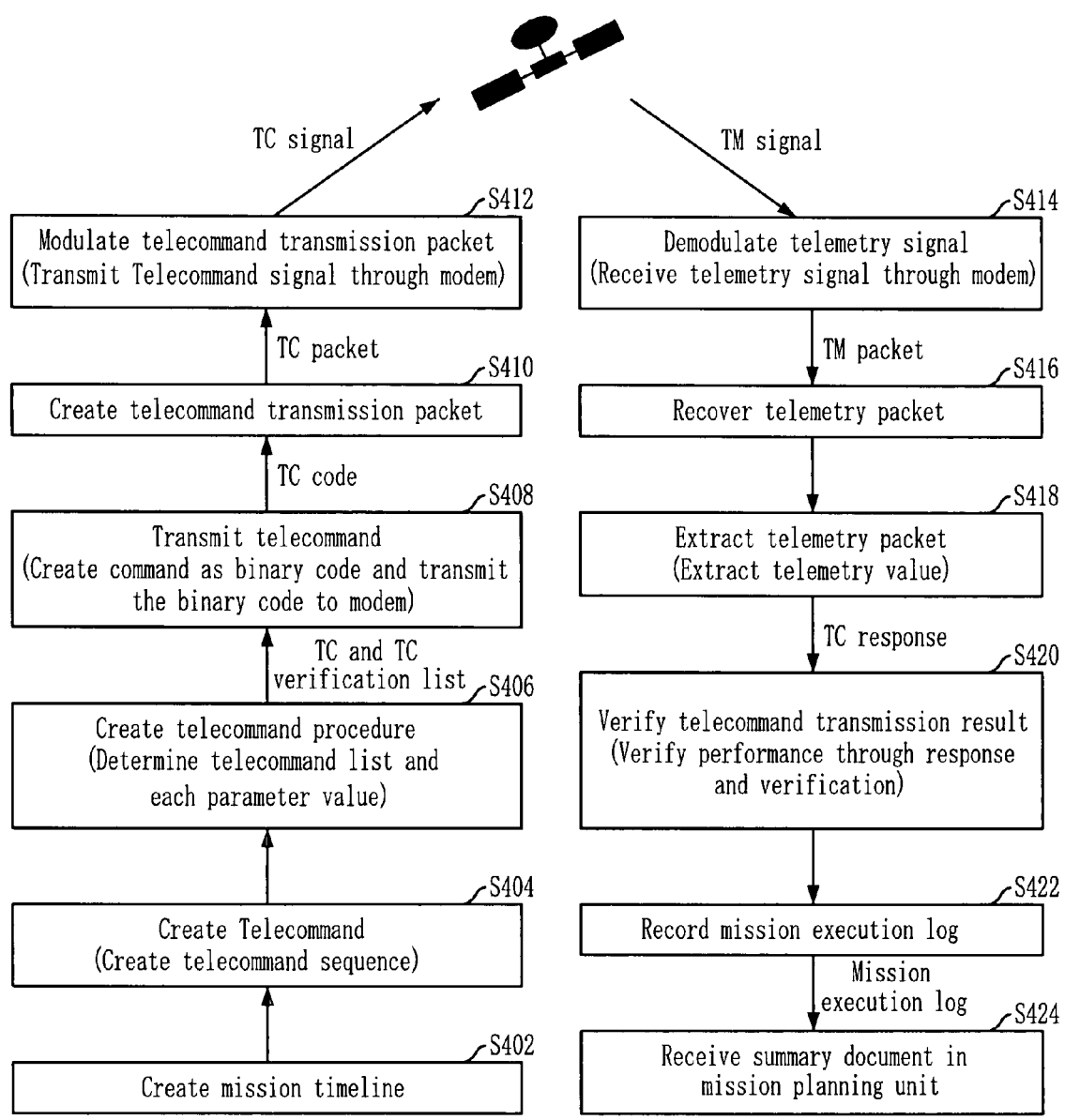
FIG. 4 is a flowchart describing a satellite control method based on the integrated satellite operation data in accordance with an embodiment of the present invention.

FIG. 4 is a flowchart describing a satellite control method based on the integrated satellite operation data in accordance with an embodiment of the present invention.

The mission planning unit 210 creates a mission timeline including mission and task information described in FIG. 3 and records the mission and task information in the integrated satellite operation document at step S402.

The command planning unit 220 creates a telecommand, i.e., a telecommand sequence, and stores the telecommand at step S404. The command planning unit 220 records the telecommand in the integrated satellite operation document.

The command preparing unit 230 creates a telecommand procedure based on the telecommand and determines a telecommand list and each parameter value of telecommand at step S406. Also, the command preparing unit 230 records the telecommand procedure in the integrated satellite operation document.

The telemetry/telecommand kernel 240 for performing the command transmission stores the telecommand binary code to be transmitted to the modem 250 in the integrated satellite operation document at step S408.

The modem 250 receives the telecommand binary code from the telemetry/telecommand kernel 240, creates a telecommand transmission packet at step S410, modulates the telecommand transmission packet to transmit a telecommand signal, and transmits the telecommand signal to the satellite at step S412.

The satellite receives the telecommand signal and transmits whether the telecommand signal is normally received based on the telemetry signal.

The modem 250 receives and demodulates the telemetry signal at step S414. The modem 250 recovers the telemetry packet through the demodulating procedure at step S416.

The telemetry/telecommand kernel 240 extracts the recovered telemetry packet according to each of the telemetry data at step S418.

The command verifying unit 260 checks telemetry data which can determine whether the telecommand among the extracted telemetry data is normally received or whether the telecommand is performed and verifies the telecommand transmission result at step S420.

When all commands are verified, the command verifying unit 260 records at step S422 whether the mission including the related commands is normally operated in the mission execution log item of the integrated satellite operation document. The command verifying unit 260 transmits the integrated satellite operation document, which is a final result, to the mission planning unit 210. Otherwise, the command verifying unit 260 transmits only a summary document including a mission and execution log information in the integrated satellite operation document to the mission planning unit 210 at step S424.

Figure 5:
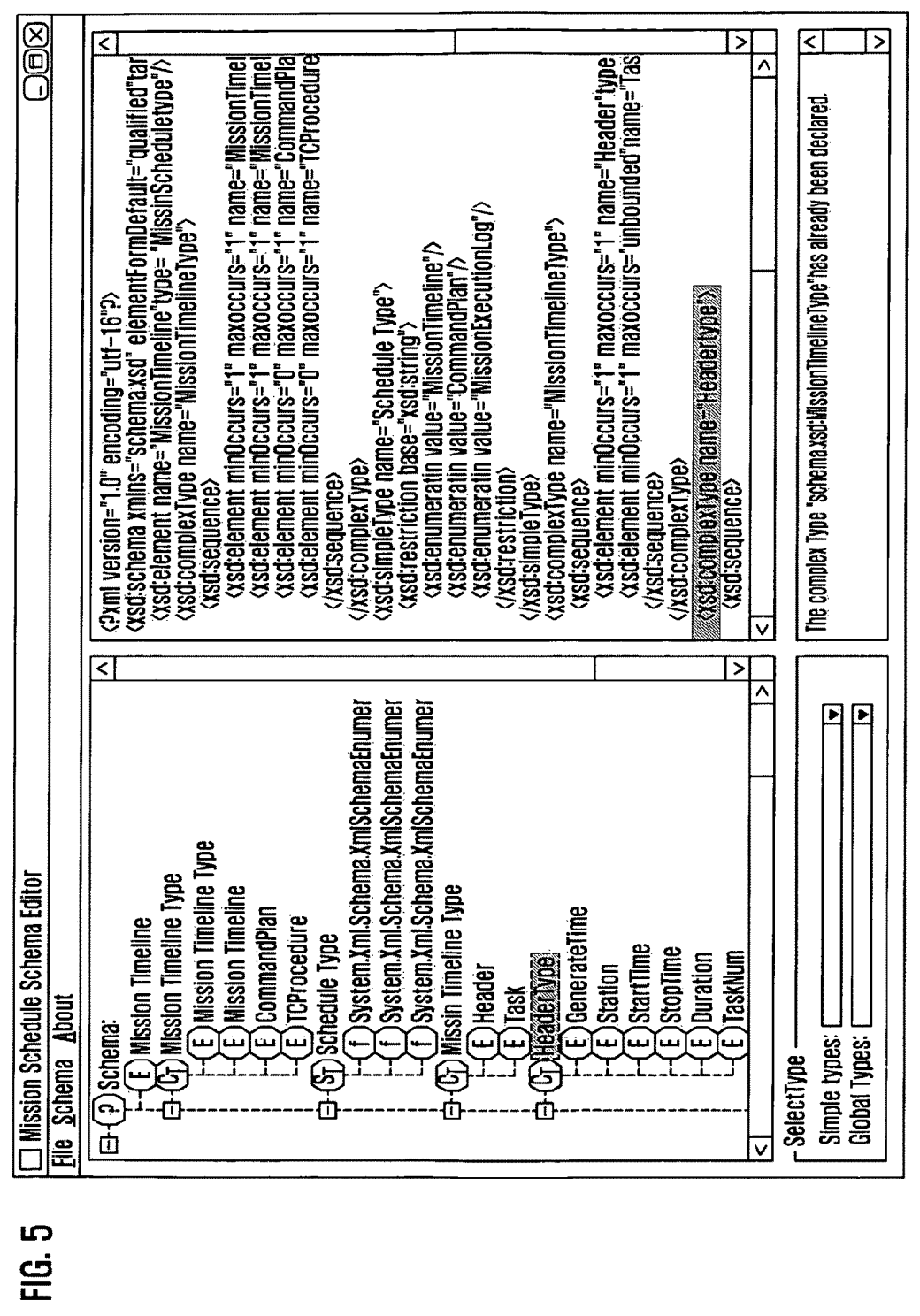

FIG. 5 shows a satellite operation data schema editor of FIG. 1.

The user can structurally describe contents to be stored in the satellite operation data based on the satellite operation data schema editing unit 170. As shown in FIG. 5, data are structurally connected to each other in one file. Therefore, relationship between diverse information included in the integrated satellite operation document can be grasped without an individual identifier.

Figure 6:
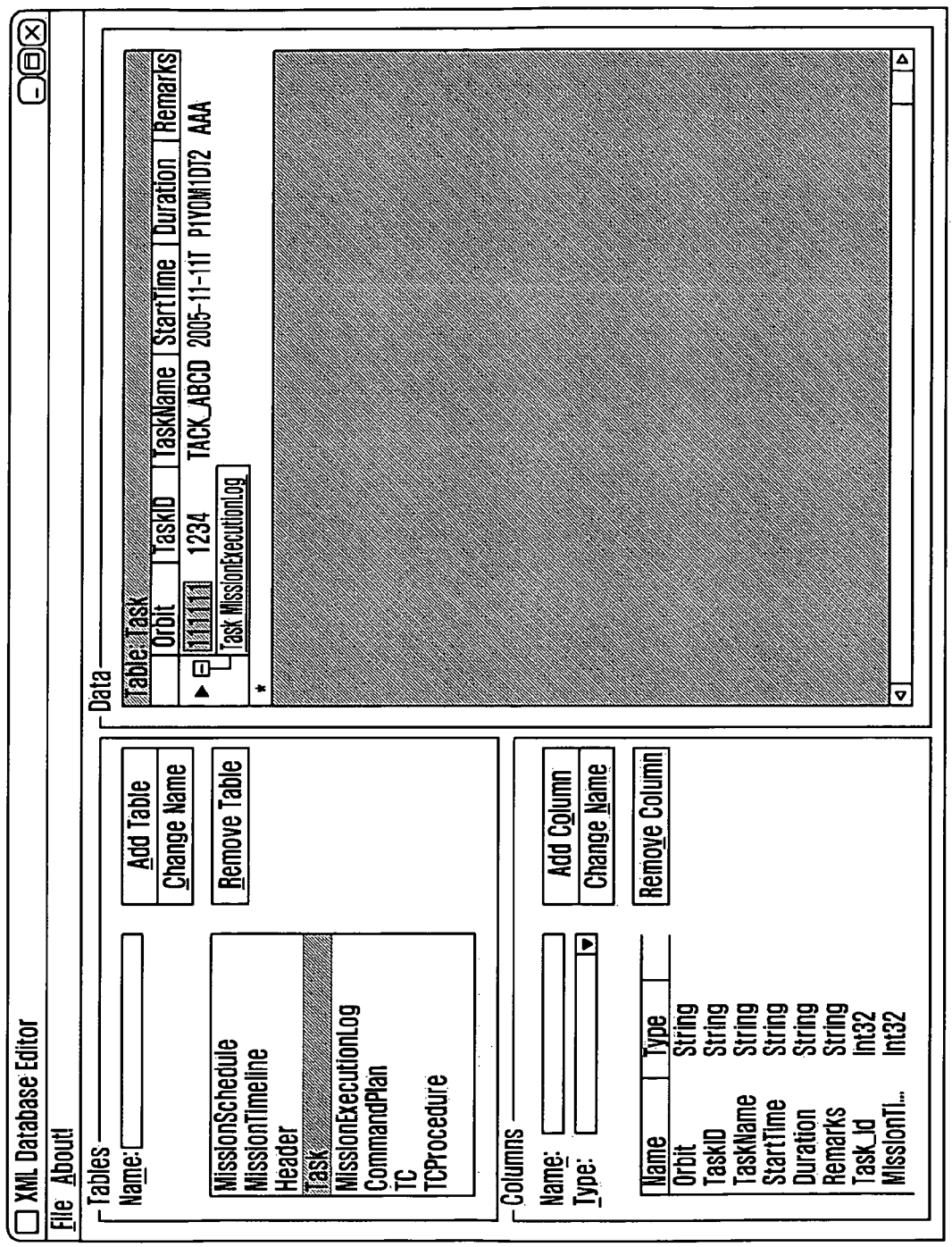
FIG. 6 shows a satellite operation data editor which is applied to the present invention.

FIG. 6 shows a satellite operation data editor which is applied to the present invention.

The satellite operation data can be edited/managed based on the contents of the integrated satellite operation document defined through the satellite operation data schema editor of FIG. 5. The satellite operation data schema editing unit 170 can manage data required for the satellite operation according to the intention of the user by applying an Extensible Markup Language (XML) technology based on the schema of the document. As shown in FIG. 6, the satellite operation data schema editing unit 170 can edit or manage a mission schedule, a mission timeline, a header, and a task based on an XML database editor.

The present invention can easily grasp relationship of the satellite operating function and easily perform a history managing process on the operation information by managing integrated satellite operation data, which is used in diverse formats in the conventional satellite control system, and controlling the satellite based on the integrated satellite operation document.

Since the present invention defines the schema of the document by applying the XML technology, data required for satellite operation can be flexibly used and an operator can intentionally manage necessary information anytime.

The present invention can easily grasp relationship between diverse information based on the integrated satellite operation document for structurally connecting data in the inside of one file. When the files are individually managed, an individual identifier such as a time tag and identification (ID) for grasping relationship may be required.

Since the present invention can design/develop each function for forming the control system in consideration of only one of input/output data, the present invention activates the control system development based on an integrated input/output interface in comparison with the conventional control system development, which should be able to process diverse files.

The present invention can efficiently analyze a large quantity of data, for a satellite operation period e.g., analysis of general data and analysis of record in generation of abnormal state. Also, the present invention can quickly and exactly manage data history.

The present invention can share data with other satellite each other by standardizing sizes of a database, a telecommand and telemetry data based on the XML, which is recently one of the satellite control technologies.

As described above, the technology of the present invention can be realized as a program and stored in a computer-readable recording medium, such as CD-ROM, RAM, ROM, floppy disk, hard disk and magneto-optical disk. Since the process can be easily implemented by those skilled in the art of the present invention, further description will not be provided herein.

While the present invention has been described with respect to the specific embodiments, it will be apparent to those skilled in the art that various changes and modifications may be made without departing from the spirit and scope of the invention as defined in the following claims.

What is claimed is:

1. A satellite control system based on integrated satellite operation data, comprising:
    a satellite operation data schema editing unit for creating a document type definition file, and defining a schema of an integrated satellite operation document;
    a mission planning unit for creating a mission timeline upon mission request from a user, and recording the mission timeline in the integrated satellite operation document;
    a command planning unit for converting a task for performing a mission into telecommands based on the created mission timeline, and recording the telecommand in the integrated satellite operation document;
    a command preparing unit for creating a telecommand procedure on the converted telecommand, and recording the telecommand procedure in the integrated satellite operation document;
    a command transmitting unit for creating a telecommand code on the created telecommand procedure, transmitting the telecommand code to a satellite, and recording the telecommand code in the integrated satellite operation document;
    a command verifying unit for receiving telemetry data corresponding to the transmitted telecommand code from the satellite, and recording a telecommand verification result on the received telemetry data in the integrated satellite operation document; and
    a performance result reporting unit for creating a mission result on the telecommand, and recording the mission result in the integrated satellite operation document;
    wherein the integrated satellite operation document includes satellite operation data file of the integrated satellite operation document;
    wherein the satellite operation data have different formats according to each functional operation of the satellite;
    wherein the different formats include .osl format as an output of mission planning according to the mission timeline, .xml format as an output file of command planning according to the telecommand and the telecommand procedure, .dat format as an output file of command preparation according to the telecommand and the telecommand procedure, .bin format as an output file command transmission according to the telecommand code, .log format as an output file of command verification result according to the telecommand verification result, and .html format as an output file of mission result report function according to the mission result.

2. The system of claim 1, wherein the satellite operation data schema editing unit defines items to be included in the integrated satellite operation document, and defines structural relationship between the items.

3. The system of claim 1, wherein the integrated satellite operation document is formed based on Extensible Markup Language (XML), and is a file storing a mission and mission's attribute information, a task and task's attribute information, a telecommand sequence and telecommand sequence's parameter information, a telecommand binary code, a telecommand verification result, and a mission result as one file.

4. A satellite control method based on integrated satellite operation data comprising the steps of:
    a) defining a schema of an integrated satellite operation document;
    b) creating a mission timeline upon mission performance request from a user, and recording the mission timeline in the integrated satellite operation document;
    c) converting a task for performing a mission into a telecommand based on the created mission timeline and recording the telecommand in the integrated satellite operation document;
    d) creating and recording a telecommand procedure on the converted telecommand in the integrated satellite operation document;
    e) creating a telecommand code on the created telecommand procedure to a satellite, transmitting the telecommand code to the satellite, and recording the telecommand code in the integrated satellite operation document;
    f) receiving telemetry data corresponding to the telecommand code transmitted from the satellite and recording the telecommand verification result on the received telemetry data in the integrated satellite operation document; and
    g) creating a mission performance result on the telecommand and recording the mission performance result in the integrated satellite operation document;
    wherein the integrated satellite operation document includes satellite operation data in a file of the integrated satellite operation document;
    wherein the satellite operation data have different formats according to each functional operation of the satellite;
    wherein the different formats include .osl format as an output file of mission planning according to the mission timeline, .xml format as an output file of command planning according to the telecommand and the telecommand procedure, .dat format as an output file of command preparation according to the telecommand and the telecommand procedure, .bin format as an output file of command transmission according to the telecommand code, .log format as an output file of command verification result according to the telecommand verification result, and .html format as an output file of mission result report function according to the mission result.

5. The method of claim 4, wherein the defining a schema defines items to be included in the integrated satellite operation document, and defines structural relationship between the items.

6. The method of claim 4, wherein the integrated satellite operation document is formed based on Extensible Markup Language (XML), and is a file storing a mission and mission's attribute information, a task and task's attribute information, a telecommand sequence and parameter information of the telecommand, a telecommand binary code, a telecommand verification result, and a mission performance result as one file.

* * * * *